United States Patent

Khan et al.

[11] Patent Number: 5,870,258
[45] Date of Patent: Feb. 9, 1999

[54] CONDUCTIVE TRACE FLEXURE FOR A MAGNETIC HEAD SUSPENSION ASSEMBLY

[75] Inventors: Amanullah Khan, Pleasanton; Kevin Patrick Hanrahan, San Jose; Yiao-Tee Hsia, Pleasanton, all of Calif.

[73] Assignee: Read-Rite Corporation, Milpitas, Calif.

[21] Appl. No.: 931,775

[22] Filed: Sep. 16, 1997

Related U.S. Application Data

[63] Continuation of Ser. No. 600,240, Feb. 12, 1996, abandoned.

[51] Int. Cl.⁶ .................................................. G11B 5/54
[52] U.S. Cl. ............................................... 360/104
[58] Field of Search ............................................ 360/104

[56] References Cited

U.S. PATENT DOCUMENTS

| | | | |
|---|---|---|---|
| 5,001,583 | 3/1991 | Matsuzaki | 360/104 |
| 5,006,946 | 4/1991 | Matsuzaki | 360/104 |
| 5,408,373 | 4/1995 | Bajorek et al. | 360/104 |
| 5,454,158 | 10/1995 | Fontana et al. | 360/104 X |
| 5,491,597 | 2/1996 | Bennin et al. | 360/104 |
| 5,528,819 | 6/1996 | McKay et al. | 3620/104 X |

*Primary Examiner*—John H. Wolff
*Attorney, Agent, or Firm*—Robert King; Samuel A. Kassatly

[57] ABSTRACT

A magnetic head suspension assembly for transducing data from and onto a surface of a rotating magnetic disk includes a load beam for supplying a directed force to a slider, so as to maintain the slider at a desired height above the disk surface. A flexure is secured to the load beam, and is formed of a flexible dielectric layer on which a pattern of conductive traces are formed. These conductive traces are patterned for providing sufficient flexibility in various degrees of movement and stiffness to resist physical deformation, for imparting optimal mechanical and structural support to the slider and to the load beam, and for electrically connecting the slider to read/write electronic circuitry. In the preferred embodiment, the dielectric layer is made of a polymeric resinous material, such as polyimide, and the conductive traces are made of copper.

20 Claims, 7 Drawing Sheets

CONDUCTIVE TRACE FLEXURE FOR A MAGNETIC HEAD SUSPENSION ASSEMBLY

This application is a continuation of application Ser. No. 08/600,240, filed on Feb. 12, 1996, now abandoned.

FIELD OF THE INVENTION

This invention relates to an improved magnetic head suspension assembly and in particular to a conductive trace flexure configuration incorporated in the suspension assembly.

DESCRIPTION OF THE PRIOR ART

Disk drives typically include a stack of spaced apart, concentric magnetic storage disks mounted on a common shaft, and an actuator arm assembly encased within a housing. The actuator arm assembly comprises a plurality of arms extending into spacings between the disks. Mounted on the distal end of each arm is a resilient suspension assembly which in turn carries an air bearing slider. Included in the suspension assembly is a load beam, which is mounted at one end to the actuator arm by means of a baseplate, and a flexure which is attached to the other end of the load beam and pivotally supports the slider.

The load beam provides the resilient spring action that biases the slider toward the surface of an associated disk, while the flexure provides flexibility for the slider. A thin film magnetic transducer is deposited at an end of the slider to interact in transducing relation with the magnetic disk.

The suspension provides dimensional stability between the slider and the actuator arm, controlled flexibility in pitch and roll motion of the slider relative to its direction of motion on the rotating disk, and resistance to yaw motion. A conventional suspension assembly provides a preload force against the slider which is compensated by the aerodynamic force generated between the air bearing surface of the slider and the disk surface. Thus, the slider is maintained in extremely close proximity to the disk surface.

The flexure is subject to oscillation and vibration, particularly at high resonant frequencies, and is further subject to bending and twisting forces and sway or lateral displacement. During the startup of a disk drive and during the seek mode, when the head accesses the data tracks and is moved radially between selected data tracks, the flexure may experience undue vibration at a resonant frequency. Also, if the head assembly is suddenly stopped at a crash stop, which is typically located near the radial ends of the data tracks, the unit may undergo track failure or other mechanical disturbance so that the suspension and its slider will experience shock and oscillate, particularly at a high resonant frequency. In addition, excessive bending of the flexure during disk drive operation can cause fatigue of the flexure metal body and may result in degradation of the load force supplied to the slider.

In a conventional suspension, the electrical connection between the transducer and the read/write driver electronics is made by twisted wires which run the length of the suspension load beam and extend over the flexure and slider. The ends of the wires are soldered or ultrasonically bonded to the transducer on the slider.

In this design, the stiffness of the twisted wires is typically negligible compared to the air-bearing stiffness. However, the trend in disk drive manufacturing is toward miniaturization, and high performance with fast data seek and write time and high density recording. It is well known that reducing the spacing between the transducer of the air bearing slider and the recording surface of the disk enables an increase in data signal recording density. Therefore, sliders are reduced in size and the flying heights are made to be lower. To accommodate these requirements, and for a slider to fly close to the disk surface, the magnetic head suspension must be, inter alia, low in roll and pitch stiffness and high in lateral stiffness. As a result, the effect of the stiffness associated with the wires becomes clearly noticeable. A decrease in the size of these wires will decrease their stiffness, but will simultaneously increase their electrical resistance, thus degrading their performance and rendering them less reliable. Such a decrease in the wire size further reduces their ability to be handled efficiently during manufacture of the suspension assembly.

A desired objective of the flexure design is to eliminate the conventional electrical wires. Such a flexure is described in U.S. Pat. Nos. 5,001,583 and 5,006,946. However, there is a significant and still unsatisfied need for a wireless suspension configuration which enables the realization of minimal spacing between the stacked disks or Z-height reduction, and the optimization of the ratio of air bearing stiffness to suspension stiffness.

SUMMARY OF THE INVENTION

An object of this invention is to provide a new wireless conductive trace flexure for a magnetic head assembly.

A further object is to provide a flexure which optimizes the air bearing stiffness to the suspension stiffness ratio, which decreases the height compaction of the head assembly, and which increases its manufacturing yield.

Another object is to use readily available materials in the manufacture of the flexure, for reducing the overall manufacture cost of the head assembly.

Still another object is to provide a flexure with trace conductors having sufficient structural and mechanical support for use as a load or moment carrying component.

Yet another object is to provide a flexure that may be used in conjunction with the suspension elements of existing head assemblies.

The foregoing and further objects of the present invention are realized by a magnetic head suspension assembly that includes a load beam for supplying a directed force to a slider, so as to maintain the slider in a balanced equilibrium position at a desired height above the disk surface. A flexure is secured to the load beam, and is formed of a flexible laminate comprised of a pattern of conductive traces which is held in place, and electrically insulated by a compliant dielectric material. These conductive traces are patterned for providing sufficient agility in various degrees of movement and stiffness to resist physical deformation, for imparting optimal mechanical and structural support to the slider and to the load beam, and further for electrically connecting the slider to remotely located read/write electronic circuitry. In the preferred embodiment, the conductive traces are made of copper, and the laminate is made of a polymeric resinous material, such as polyimide.

The flexure has a forward section, a bend section, and a rearward section. The forward section extends generally symmetrically along a protrusion section of the load beam, and is fixedly attached thereto along almost its entire length via welding or gluing. Such symmetry is desirable to provide desirable resonance frequency and static stiffness characteristics. The bend section extends, integrally, into the rearward section, which is generally flattened against, and secured to a lateral edge of the load beam. The rearward section of the flexure extends toward the actuator arm assembly for connection to the read/write electronic circuitry.

BRIEF DESCRIPTION OF THE DRAWINGS

The invention will be described in greater detail with reference to the drawing in which.

Similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 1:
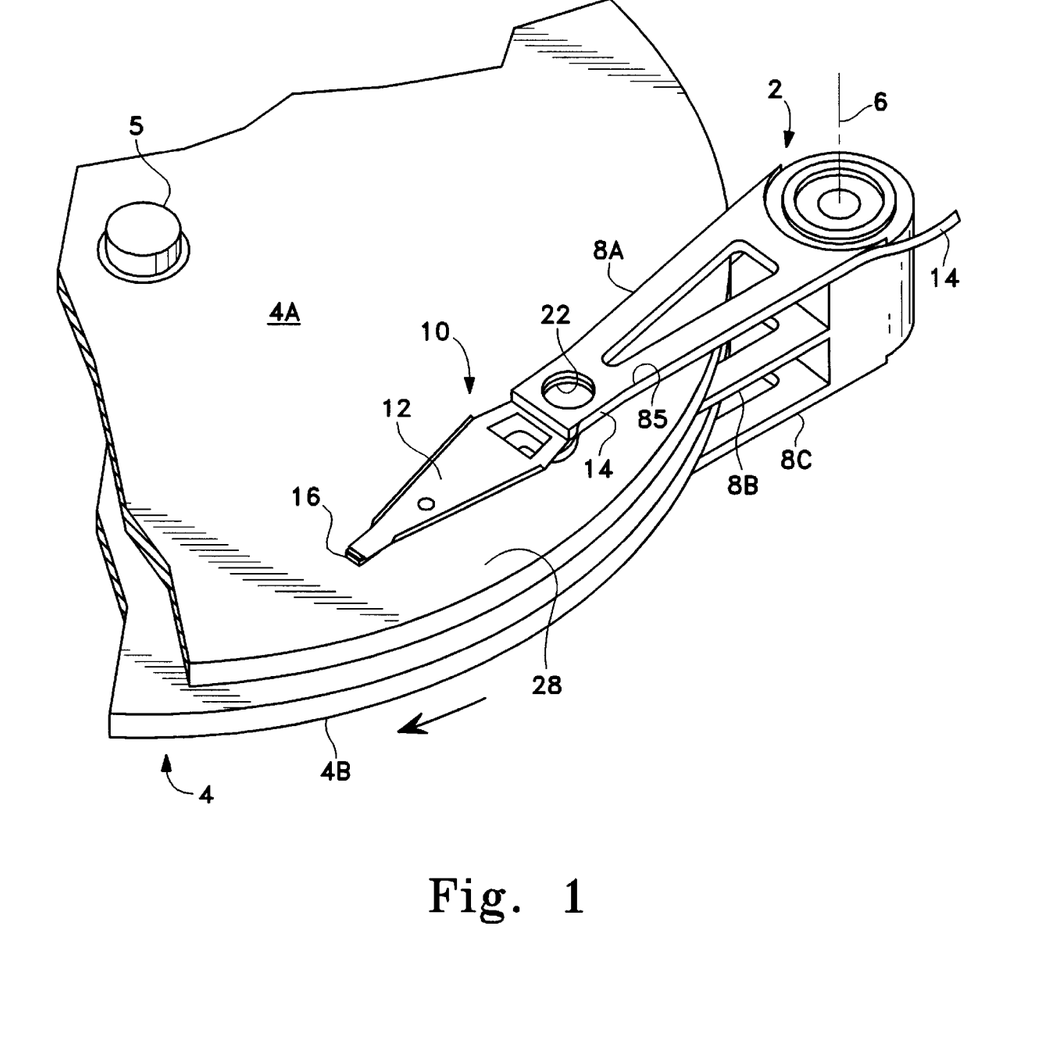
FIG. 1 is a fragmentary view of a disk drive having a magnetic head suspension which includes the flexure of the present invention.

FIG. 1 shows a fragmentary view of a disk drive having an actuator arm assembly 2 and a stack of spaced apart disks 4 rotatable about a common shaft 5. The actuator arm assembly 2 is rotatable about an actuator arm axis 6. The arm assembly 2 includes a plurality of actuator arms 8A–8C which extend into the spacings between the disks 4A and 4B. Attached to each of the actuator arms 8A–8C is a magnetic head suspension 10, which comprises a resilient load beam 12, a flexure 14 and a slider 16.

Figure 2:
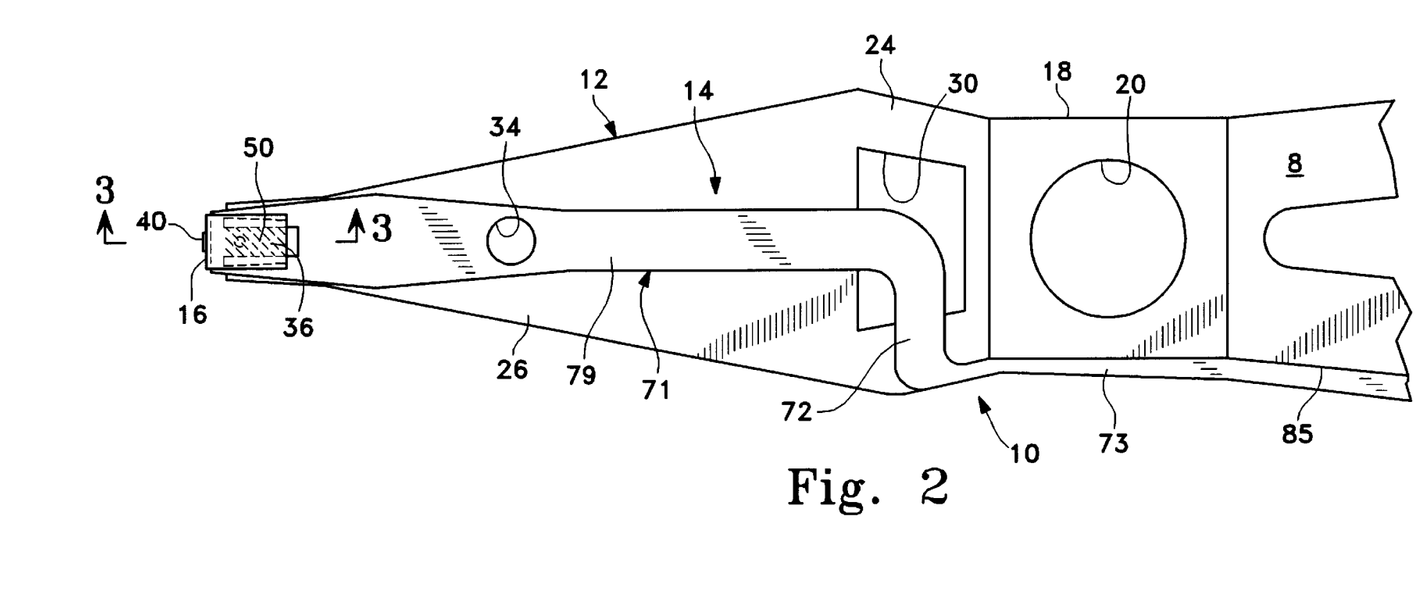
FIG. 2 is an enlarged bottom plan view of the suspension of FIG. 1.

FIG. 2 shows the suspension 10 in further detail. The load beam 12 includes a base section 18 having a boss 20 insertable into a hole 22 (FIG. 1) of the actuator arm 8A. The load beam 12 also includes a resilient section 24 located between the base section 18 and a protrusion section 26 respectively of the load beam 12. The protrusion section 26 is also referred to herein as a forward section 26. The resilient section 24 is formed to create an angular offset between the base section 18 and the protrusion section 26. The degree of bending determines the downward preload force of the slider 16 toward the disk surface 28. An aperture 30 may also be provided in the resilient section 24. The size of the aperture 30 would establish the resilience of the load beam 12. The protrusion section 26 is normally made relatively rigid by a pair of reinforcement ribs or regions (not shown) that are integrally formed along the edges of section 26. However, according to the present invention, this pair of reinforcement ribs may optionally be eliminated since the flexure 14 could be designed to provide the required mechanical and structural support to the protrusion section 26.

Part of the flexure 14 is positioned underneath the protrusion section 26 of the load beam 12. An alignment hole 34 in the flexure 14 is provided for the alignment of the corresponding hole (not shown) in the protrusion section 26, thereby orienting the flexure 14 in a proper location.

Figure 3:
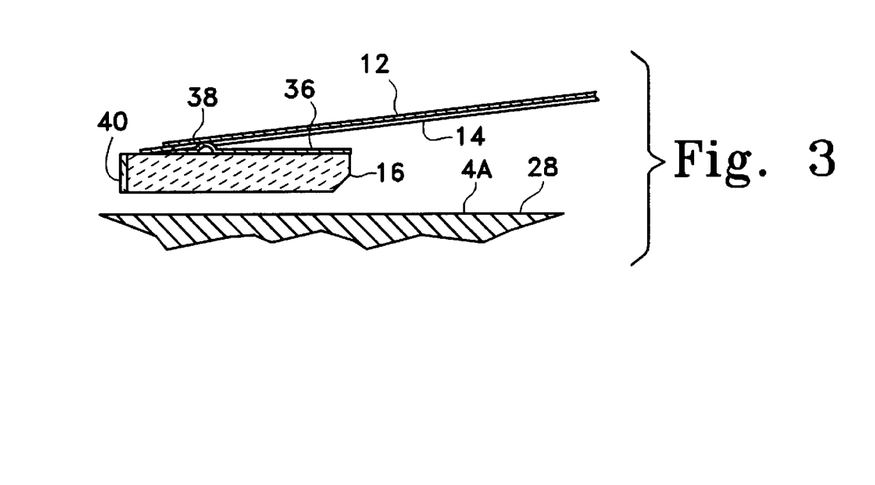
FIG. 3 is a greatly enlarged partial cross-sectional view of the forward section of the suspension taken along line 3—3 of FIG. 2, illustrating the position of a slider relative to a rotating disk.
Figures 4, 6:
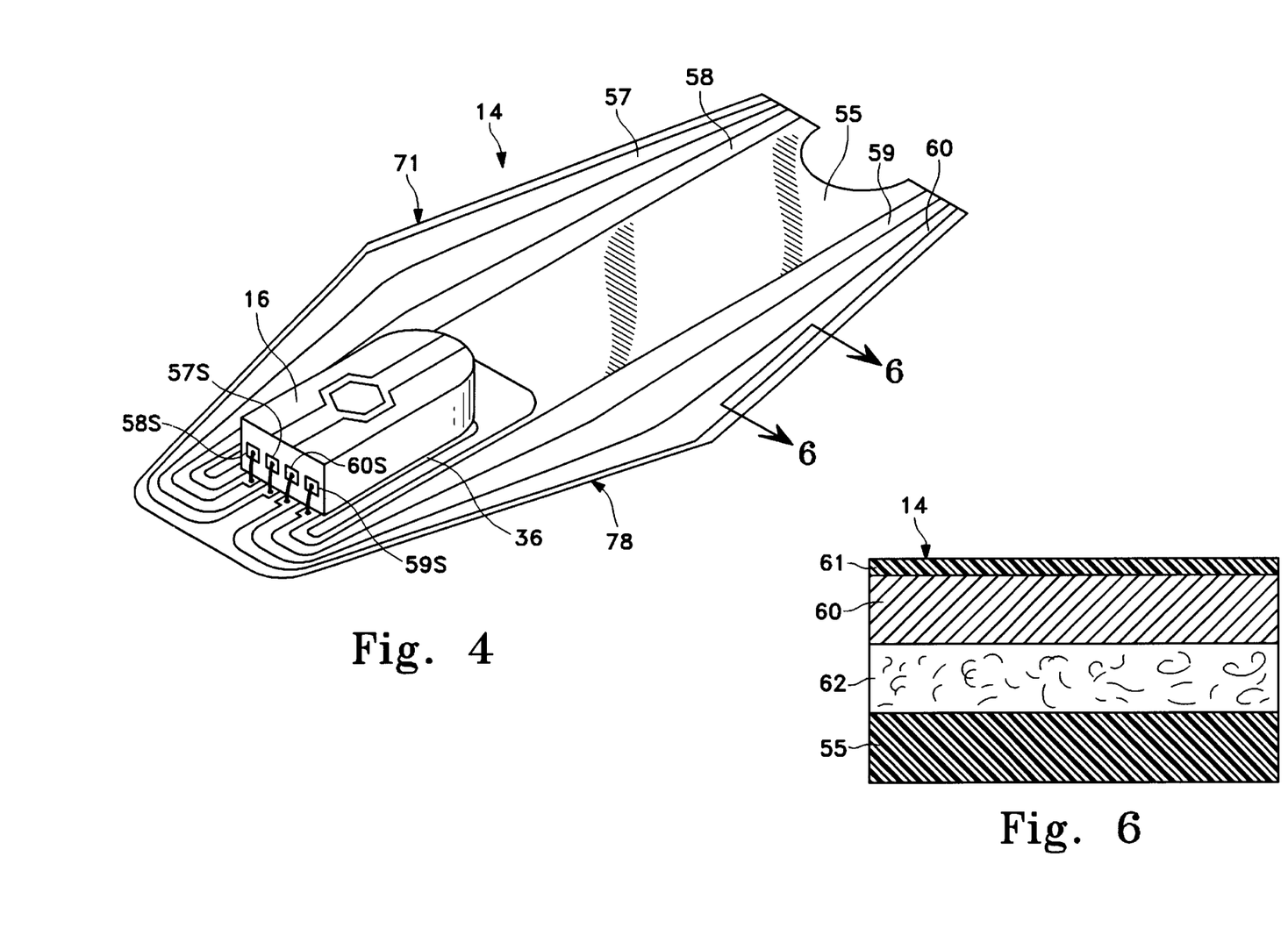
FIG. 4 is a perspective view of the forward section of the flexure showing the conductive traces patterned according to one embodiment of the present invention.
FIG. 6 is a front view of two side-by-side flexures, for illustrating the manufacturing process.

As illustrated in FIGS. 3 and 6, a tongue 36 is integrally formed in the flexure 14. The slider 16 is fixedly attached, by means of adhesive that is cured by ultraviolet radiation, by way of example, to the tongue 36 in the shaded area identified by the reference numeral 50 (FIG. 2). A dimple 38 is formed in the load beam 12, and is urged against the backside of the slider 16 through a clearance hole 65 formed in the tongue 36, and contributes to the gimbaling action. Alternatively, the dimple 38 may be formed on the tongue 36, and is urged against the underside of the load beam 12. A transducer 40 is disposed at the rear edge of the slider 16. The backside of slider 16 includes a conductive contact pad at ground potential. The embodiment illustrated in FIG. 3 shows the tongue 36 being secured to the backside of the slider 16 and formed as part of the flexure 14.

Figure 5:
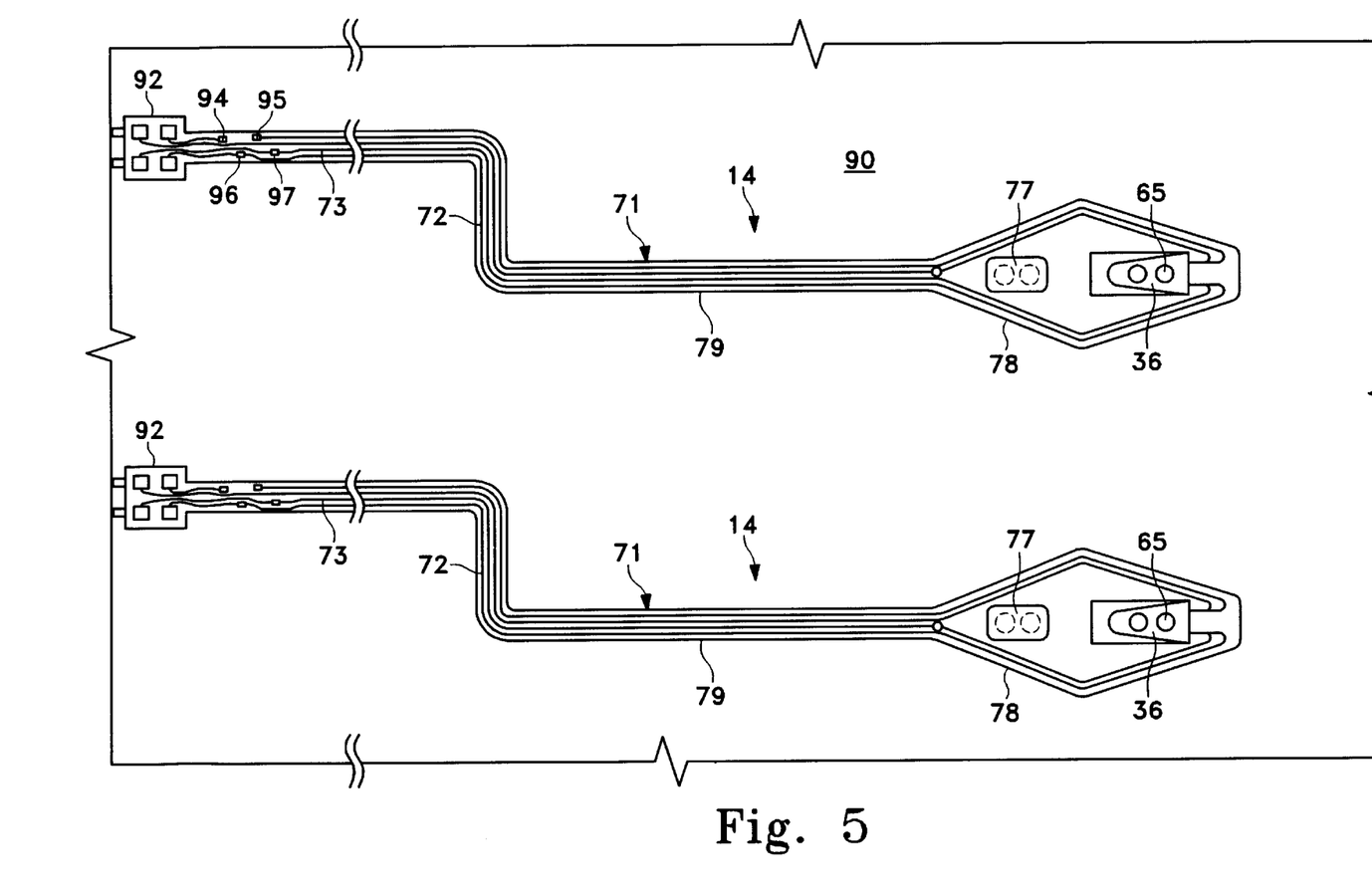
FIG. 5 is an enlarged cross-sectional view of the flexure taken along line 6—6 of FIG. 4.
Figure 7:
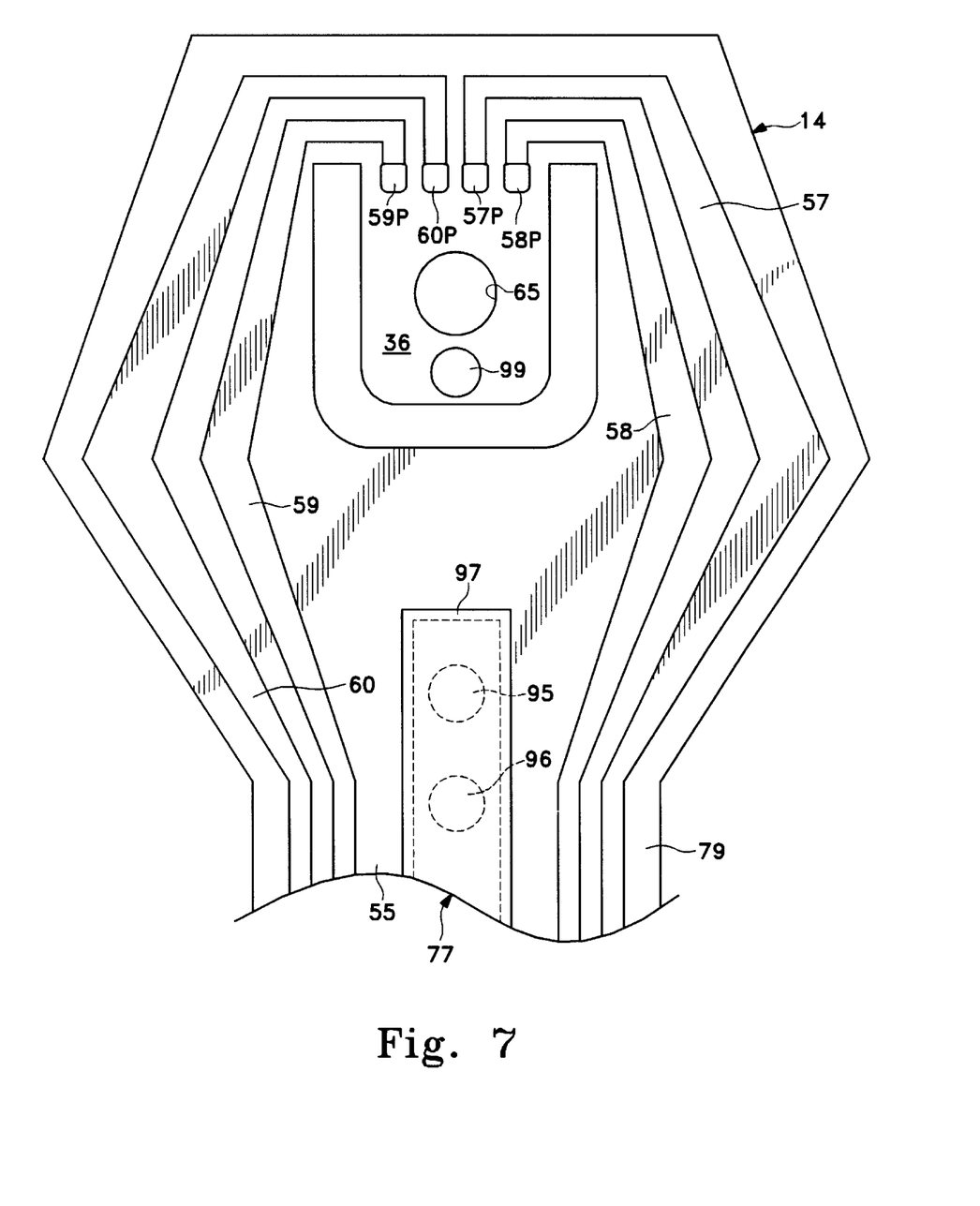
FIG. 7 is a greatly enlarged bottom plan view of the forward section of the flexure of FIG. 5, showing the conductive traces patterned according to another embodiment of the present invention.
Figure 8:
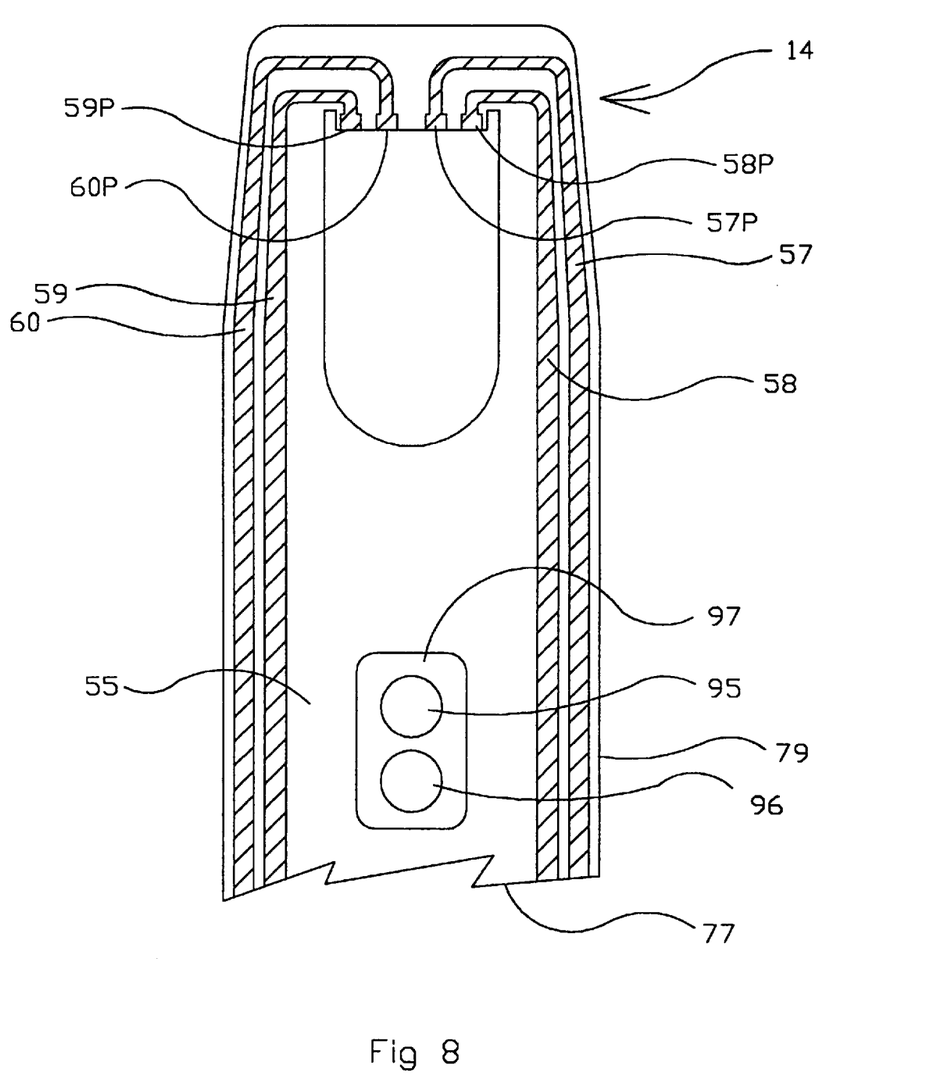
FIG. 8 is a greatly enlarged bottom plan view of the forward section of the flexure of FIG. 5, showing the conductive traces patterned according to yet another embodiment of the present invention.
Figure 9:
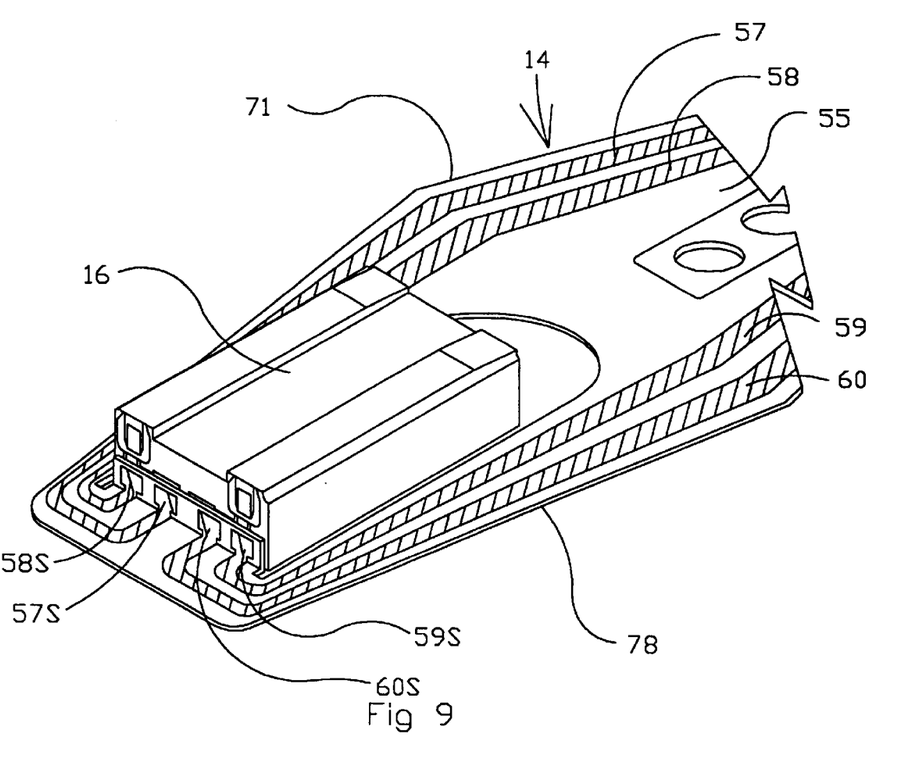
FIG. 9 is a perspective view of the forward section of the flexure of FIG. 8

Referring to FIGS. 4 and 5, the flexure 14 is formed of a flexible laminate comprised of a pattern of conductive traces 57–60 that are retained and electrically insulated by a compliant dielectric layer 55. The dielectric layer 55 is a flat, flexible sheet of material bonded on one side to the patterned conductive traces 57–60. FIG. 7 illustrates a different pattern for the conductive traces 57–60, and further shows that the tongue 36 defines a dimple clearance hole 65. The dielectric layer 55 is made of plastic or a polymeric resinous material, such as polyimide, and is bonded by means of a glue layer 62, for example, to the conductive traces.

The conductive traces 57–60 may be made of conductive material, such as steel, beryllium, gold, silver, but preferably from copper, due to copper's desirable conductivity and tensile modulus. FIG. 6 shows that the conductive traces 57–60 and the bottom surface of the flexure 14 are coated with an external layer 61 in order to prevent the conductive traces from shorting.

The flexure 14 provides sufficient flexibility in various degrees of movement for accommodating the uneven topology of the disk surface 28, while the slider 16 is flying over the disk 4A, and yet sufficiently stiff to resist any physical deformation that may be caused by the rapid movements of the actuator arm assembly 2. For this purpose, the conductive traces 57–60 are patterned so as to impart optimal mechanical and structural support to the slider 16 and the load beam 12.

FIGS. 2 and 4 illustrate the flexure 14 as having a distal or forward (or portion) section 71, a bend section (or portion) 72, and a proximal or rearward section (or portion) 73. The forward section 71 extends generally symmetrically relative to the protrusion section 26 of the load beam 12, and is fixedly attached thereto along almost its entire length, via welding or gluing. Such symmetry is desirable because it tends to provide desirable resonance frequency and static stiffness characteristics.

While the dielectric layer 55 has a generally uniform thickness, it is possible, and sometimes desirable to change the thickness of certain portions of the dielectric layer 55, to optimize its stress and load carrying distribution. For instance, with reference to FIG. 7, the thickness of the portion of the dielectric layer 55 forming the tongue 36 may optionally be thicker than that of the remaining forward section 71, particularly the sections on which the conductive traces 57–60 are deposited.

In order to further add stiffness or strength, or for controlling the flexure flatness or flow of the adhesive used to join the slider and flexure tongue, additional stiffening ribs, or traces 77 (FIG. 7), made from conductive or nonconductive material, are patterned on the dielectric layer 55. In the illustration shown in FIG. 7, the stiffening rib 77 is deposited on the top side of the flexure 14 for bonding to the load beam 12. The stiffening rib 77 is formed of one or more bond sites 95, 96 and a peripheral contour trace 97 for limiting the adhesive flow. A bond site or sites 99 are also formed on the tongue 36. The bond sites 95, 96, 99 can be used as visual aids for facilitating the manufacture of the flexure 14. In another embodiment, the bond site 99 can be formed of an electrically conductive material for providing a ground connection.

The conductive traces 57–60 terminate at the forwardmost section of the flexure 14 in conductive pads 57P–60P, respectively, for connection to corresponding pads 57S–60S on the slider 16. Some exemplary methods for providing such connections include stitch bonding and ultrasonic welding.

In the embodiment illustrated in FIGS. 2 and 4, the forward section 71 of the flexure 14 includes a wing 78 that is shaped and dimensioned to assist in the balancing of the air bearing stiffness and the suspension stiffness. The wing 78 extends integrally, and still underneath the load beam 12, into a generally uniform, elongated tail 79, which terminates proximally to the resilient section 24 of the load beam 12. One objective of the present design is to extend the tail 79 as far toward the actuator arm assembly 2, as possible, in order to minimize the effect on the load force spring rate.

In the present illustration, the bend section 72 extends close to the middle of the load beam resilient section 24. The bend section 72 continues into the rearward section 73, which is generally flattened against, and secured to a lateral edge 85 (FIGS. 1 and 2) of the load beam 16. The rearward section 73 of the flexure 14 extends rearwardly for connection to the read/write electronics (not shown) of the disk 4A.

While it is desirable to have the air bearing determine the flying height of the slider 16 above the disk surface 28, it is also desirable to have a large enough suspension stiffness to be able to manipulate the flying height by the mechanical manipulation of the load beam 12. In the present example, the conductive traces and their geometric pattern, as well as the shape and positioning of the forward section 71, are designed and correlated to impart an optimal stiffness to the slider 16. Furthermore, the conductive traces 57–60 are generally wide enough to act as load and moment carrying members.

FIG. 6 illustrates the relative simplicity of the manufacturing process of the flexure 14. The flexure 14 may be mass produced by patterning a series of adjacent flexures 14 on a single sheet of plastic or a polymeric resinous material 90. The external coating 61 (FIG. 6) is then deposited on top of the flexures 14. The flexures 14 are then sheared from the sheet 90, and individually tested using test pads 92 at the end of the rearward section 73. Once the flexures 14 are successfully tested, the test pads 92 are sheared, and connection pads, in this example four pads, 94–97, are exposed for connection to the read/write electronics.

The novel suspension assembly affords close disk-to-disk spacing, increased manufacturing yield, optimal air bearing stiffness to suspension stiffness ratio, and the elimination of separate conductor wires used to provide electrical conductivity between the transducer and the preamplifier circuits or drives.

It should be understood that the invention is not limited to the specific parameters, materials and embodiments described above. Various modifications and variations may be made within the scope of the present invention.

What is claimed is:

1. A suspension assembly for supporting a head, comprising:

a load beam;

flexure secured to said load beam;

said flexure being formed of a dielectric layer containing a pattern of conductive traces;

said dielectric layer providing added stiffness to said load beam;

at least some of said conductive traces being adapted for connection to the head;

said flexure including a forward portion;

said load beam including a forward section; and said flexure forward portion extending onto a substantial surface of said load beam forward section.

2. An assembly as recited in claim 1, wherein said dielectric layer is made of a polymeric resinous material.

3. An assembly as recited in claim 2, wherein said dielectric layer is made of polyimide.

4. An assembly as recited in claim 1, wherein said dielectric layer is made of plastic.

5. An assembly as recited in claim 1, wherein said conductive traces are made of copper.

6. An assembly as recited in claim 1, wherein said load beam includes a lateral edge;

wherein said flexure further includes a bend portion and a rearward portion; and wherein said flexure bend portion extends integrally into said flexure rearward portion;

and wherein said flexure rearward portion is substantially flattened against and secured to said load beam lateral edge.

7. An assembly as recited in claim 6, wherein said flexure forward portion includes a wing that extends integrally, underneath said load beam, into a substantially uniform, elongated tail, which terminates proximately to a resilient section of said load beam.

8. An assembly as recited in claim 6, wherein said dielectric layer has a generally uniform thickness.

9. An assembly as recited in claim 6, wherein the thickness of said dielectric layer is not uniform.

10. An assembly as recited in claim 6, further including stiffening regions on said flexure for increasing the stiffness of said flexure, and for controlling the flatness of said flexure.

11. An assembly as recited in claim 10, wherein said stiffening regions also act as stops for adhesive flow.

12. An assembly as recited in claim 10, further including one or more bond sites.

13. An assembly as recited in claim 12, wherein at least one of said bond sites provides a ground connection.

14. An assembly as recited in claim 6, wherein said flexure includes a test pad.

15. An assembly as recited in claim 1, wherein said flexure forward portion extends generally symmetrically over substantially the entire surface of said load beam forward section.

16. An assembly as recited in claim 1, wherein said flexure forward portion includes a tongue formed as part of said flexure for supporting the head.

17. An assembly as recited in claim 16, wherein said flexure includes a dimple that bears on the head for providing a gimballing action.

18. An assembly as recited in claim 16, wherein said load beam includes a dimple that bears on the head through a clearance opening in said tongue.

19. A suspension assembly for supporting a head, comprising:

a load beam;

a flexure secured to said load beam;

said flexure being formed of a dielectric layer containing a pattern of conductive traces;

said dielectric layer providing added stiffness to said load beam;

at least some of said conductive traces being adapted for connection to the head;

said flexure including a forward portion; and said dielectric layer in said flexure forward portion extending in a tongue for supporting the head.

20. A suspension assembly for supporting a head, comprising:

a load beam;

a flexure secured to said load beam;

said flexure being formed of a dielectric layer containing a pattern of conductive traces;

said dielectric layer providing added stiffness to said load beam;

at least some of said conductive traces being adapted for connection to the head;

said flexure including a forward portion;

said load beam including a forward section; and said flexure forward portion extending generally symmetrically over said load beam forward section.

* * * * *